(12) United States Patent
Kanazawa

(10) Patent No.: US 6,179,483 B1
(45) Date of Patent: Jan. 30, 2001

(54) COUPLING APPARATUS OF LIGHT EMITTER AND OPTICAL FIBER AND METHOD FOR ADJUSTING OPTICAL FIBER POSITION USING THE SAME

(75) Inventor: Hiroshi Kanazawa, Saitama-ken (JP)

(73) Assignee: Asahi Kogaku Kogyo Kabushiki Kaisha, Tokyo (JP)

( * ) Notice: Under 35 U.S.C. 154(b), the term of this patent shall be extended for 0 days.

(21) Appl. No.: 09/082,143

(22) Filed: May 20, 1998

(30) Foreign Application Priority Data

May 28, 1997 (JP) .................................................. 9-138472

(51) Int. Cl.[7] ...................................................... G02B 6/36
(52) U.S. Cl. ................................ 385/93; 385/66; 385/78
(58) Field of Search .................................. 385/60, 66, 72, 385/78, 88, 91, 93

(56) References Cited

U.S. PATENT DOCUMENTS 5,621,573 * 4/1997 Lewis et al. ............................ 385/93
5,668,899 * 9/1997 Jadrich .................................... 385/93

FOREIGN PATENT DOCUMENTS

| 0 443 454 | 8/1991 | (EP) . |
| 0 706 068 | 4/1996 | (EP) . |
| 0 707 225 | 4/1996 | (EP) . |
| 60-125760 | 8/1985 | (JP) . |
| 9211277 | 8/1997 | (JP) . |

* cited by examiner

Primary Examiner—Darren Schuberg
(74) Attorney, Agent, or Firm—Pitney, Hardin, Kipp & Szuch LLP

(57) ABSTRACT

A coupling apparatus for coupling a light emitting element with an optical fiber, wherein the light emitting element and a coupling lens are secured within a holder. The apparatus includes a ferrule which holds the optical fiber and which is inclined at a predetermined inclination angle with respect to the optical axis of the coupling lens, and a support member which is secured to the holder and which holds the ferrule so as to move in a direction parallel with the optical axis of the coupling lens.

12 Claims, 4 Drawing Sheets

Related Art

COUPLING APPARATUS OF LIGHT EMITTER AND OPTICAL FIBER AND METHOD FOR ADJUSTING OPTICAL FIBER POSITION USING THE SAME

BACKGROUND OF THE INVENTION

1. Field of the Invention

The present invention relates to a coupling apparatus (receptacle) of a light emitting element such as a laser diode and an optical fiber. The present invention also relates to a method for adjusting optical fiber position using the same.

2. Description of the Related Art

Recently, laser drawing apparatuses using multi-laser beams have been proposed in which a group of light sources consisting of a plurality of laser emitters and a plurality of optical fibers are provided to increase the drawing speed.

In a multi-laser beam drawing apparatus using optical fibers as a light source, the laser beam emitted from the semiconductor laser and made incident upon the incident surface of the optical fiber is partly reflected by the incident surface. If the reflected light is made incident upon the semiconductor laser, the laser emission is disturbed, thus resulting in a change in the intensity of the laser beams, etc. To avoid this, the incident surface of the optical fiber is cut along a plane inclined with respect to the center axis of the optical fiber to form an oblique incident surface, so that the light reflected thereby does not reach the semiconductor laser, as shown in FIG. 4.

In the prior art shown in FIG. 4, a laser diode (LD) 156 is secured to a lens holder 116 which holds a coupling lens 136 through an LD holder 126. The lens holder 116 is provided with an adjusting ring 166 secured thereto. The optical fiber 20 is held by a ferrule 196 so that the center axis of the optical fiber at the incident surface thereof is inclined with respect to the optical axis of the coupling lens 136 at a predetermined inclination angle. The ferrule 196 is press-fitted in the adjusting ring 166 which is secured to the lens holder 116. The incident surface of the optical fiber 20 is defined by an oblique surface 20a inclined at a predetermined inclination angle with respect to a plane perpendicular to the center axis thereof. The optical fiber 20 is held in such a way that the incident surface 20a thereof is not normal to the optical axis O1.

The ferrule 196 which holds the optical fiber 20 is not parallel with the optical axis O1 of the coupling lens 136 and is moved in the direction parallel with the center axis of the optical fiber 20 to adjust the position of the incident surface (core surface) 20a of the optical fiber 20. However, since the direction of the movement of the optical fiber 20 is inclined with respect to the optical axis O1, if the ferrule 196 is slid to move the incident surface 20a to the focal point of the coupling lens 136, not only does the distance between the incident surface 20a and the coupling lens 136 in the optical axis direction change, but also the distance between the center of the incident surface 20a and the optical axis O1 also varies. Consequently, it is difficult to adjust the incident surface 20a of the optical fiber 20 to the focal point f of the coupling lens 136.

Moreover, to establish a highly precise positional relationship between the laser diode 156 and the optical fiber 20 at the connection therebetween, the LD holder 126 and the adjusting ring 166 are independently moved along the contact surfaces thereof with the lens holder 116 in the prior art. Upon completion of the adjustment, the LD holder 126 and the adjusting ring 166 are welded to the coupling lens holder 116, for example, by a YAG laser to prevent the accidental movement thereof. Therefore, if the laser diode 156 is broken, it is difficult to replace the laser diode alone. Upon replacement of the broken LD 156, if the LD holder 126 is detached from the lens holder 116 without detaching the adjusting ring 166 to which the ferrule 196 and the optical fiber 20 are secured from the lens holder 116, it is difficult to readjust the position of the incident surface 20a of the optical fiber 20, as mentioned above.

The emission surfaces of the light sources are united in the form of a fiber array. Therefore, if a laser diode of one of the light sources is broken, it is difficult to repair or replace the LD since the laser receptacle cannot be disassembled. Furthermore, since the fiber array cannot be disassembled, the entirety of the laser sources must be replaced in spite of the fact that the remaining fibers are normal.

It is possible to secure the adjusting ring 166 to the lens holder 116 by means of screws in place of welding. However, the relative position therebetween may be changed due to the force produced in the rotation direction or forward movement direction of the screws when the screws are fastened or loosened.

SUMMARY OF THE INVENTION

It is an object of the present invention to provide a coupling apparatus for a light emitting element and an optical fiber in which the position of the optical fiber can be easily adjusted during the assembling operation.

Another object of the present invention is to provide a simple coupling apparatus of a light emitting element and an optical fiber in which the assembling and disassembling thereof can be easily carried out.

According to an aspect of the present invention, there is provided a coupling apparatus for coupling a holder, to which the light emitting element and a coupling lens are secured, with the optical fiber. This coupling apparatus includes a ferrule which holds the optical fiber and is inclined at a predetermined angle with respect to the optical axis of the coupling lens. Preferably, the incident end surface of the optical fiber is inclined at a predetermined angle with respect to a plane that is normal to the optical axis of the coupling lens.

Also provided is a support member that includes: an adjustable ring which is movable and adjustable in a plane perpendicular to the optical axis of the coupling lens and which is secured to the lens holder; a ferrule ring supported within the adjusting ring, wherein the ferrule ring is movable in a direction parallel with the optical axis of the coupling lens; and a ferrule holder which is detachably press-fitted into the ferrule ring so as to be movable in a direction parallel with the optical axis of the coupling lens. The ferrule is held by the ferrule holder at an inclined position with respect to the optical axis and is movable together with the ferrule holder in a direction parallel with the optical axis.

Alternatively, the support member can include: an adjustable ring which is movable and adjustable in a plane perpendicular to the optical axis of the coupling lens and which is secured to the lens holder; a ferrule ring supported within the adjusting ring, wherein the ferrule ring is movable in a direction parallel with the optical axis of the coupling lens; and wherein the ferrule is held in the ferrule ring at an inclined position with respect to the optical axis and is movable together with the ferrule ring in a direction parallel with the optical axis. The ferrule holder and the adjusting ring can be made of metal and can be secured to the lens holder by laser welding. Alternatively, the ferrule holder is made of metal and the adjusting ring is made of a ceramic material, so that the ferrule holder and the adjusting ring are secured to each other by an adhesive.

According to another aspect of the present invention, there is provided a coupling apparatus for a light emitting element and an optical fiber which includes: a lens holder to which the light emitting element, a coupling lens and the optical fiber are to be secured; an adjusting ring which is movable and adjustable in a plane perpendicular to the optical axis of the coupling lens and which is secured to the lens holder upon completion of the positional adjustment between the adjusting ring and the lens holder; a ferrule ring which is fitted inside the adjusting ring, movable in a direction parallel with the optical axis of the coupling lens and which is secured to the adjusting ring upon completion of positional adjustment between the ferrule ring and the adjusting ring; and a ferrule member which is fitted in the ferrule ring and which holds the optical fiber in a position so that the optical fiber is inclined at a angle with respect to the optical axis of the coupling lens. Preferably, the incident end surface of the optical fiber is inclined at a predetermined angle with respect to a plane that is normal to the optical axis of the coupling lens. Preferably, the ferrule member is movable within the ferrule ring in a direction parallel with the optical axis. Preferably, the ferrule member includes a ferrule ring fitted inside the adjusting ring (the ferrule ring being movable in a direction parallel with the optical axis of said coupling lens) and a ferrule holder which is press-fitted inside the ferrule ring (the ferrule holder supporting the optical fiber). Preferably, the ferrule member includes a single ferrule holder fitted inside the adjusting ring, the ferrule holder being movable in a direction parallel with the optical axis of the coupling lens. The ferrule holder and the adjusting ring can be made of metal and can be secured to the lens holder by laser welding. The lens holder can be made of metal and the adjusting ring can be made of a ceramic material, so that the lens holder and the adjusting ring can be secured to each other by an adhesive.

According to another aspect of the present invention, there is provided a method for adjusting the position of an optical fiber in a coupling apparatus wherein the coupling apparatus includes: a lens holder, one end of which a light emitting element and a coupling lens are secured, and the other end of which the optical fiber is connected; an adjusting ring to be secured to the lens holder; a ferrule ring which is fitted inside the adjusting ring (the ferrule being movable in a direction parallel with the optical axis of said coupling lens); and a ferrule member which is fitted inside the ferrule ring and which holds the optical fiber in a position so that the optical fiber is inclined at a predetermined angle with respect to the optical axis of the coupling lens. The method includes: moving the adjusting ring in a plane perpendicular to the optical axis of the coupling lens and securing the adjusting ring to the lens holder upon completion of position adjustment between the adjusting ring and the lens holder; and moving the ferrule ring in the adjusting ring in a direction parallel with the optical axis of the coupling lens and securing the ferrule ring to the adjusting ring upon completion of position adjustment between the ferrule ring and the adjusting ring.

Preferably, the method further includes the moving of the ferrule member in the ferrule ring in a direction parallel with the optical axis and securing the ferrule member in the ferrule ring upon completion of positional adjustment between the ferrule member and the ferrule ring.

The present disclosure relates to subject matter contained in Japanese Patent Application No.9-138472 (filed on May 28, 1997) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 5:
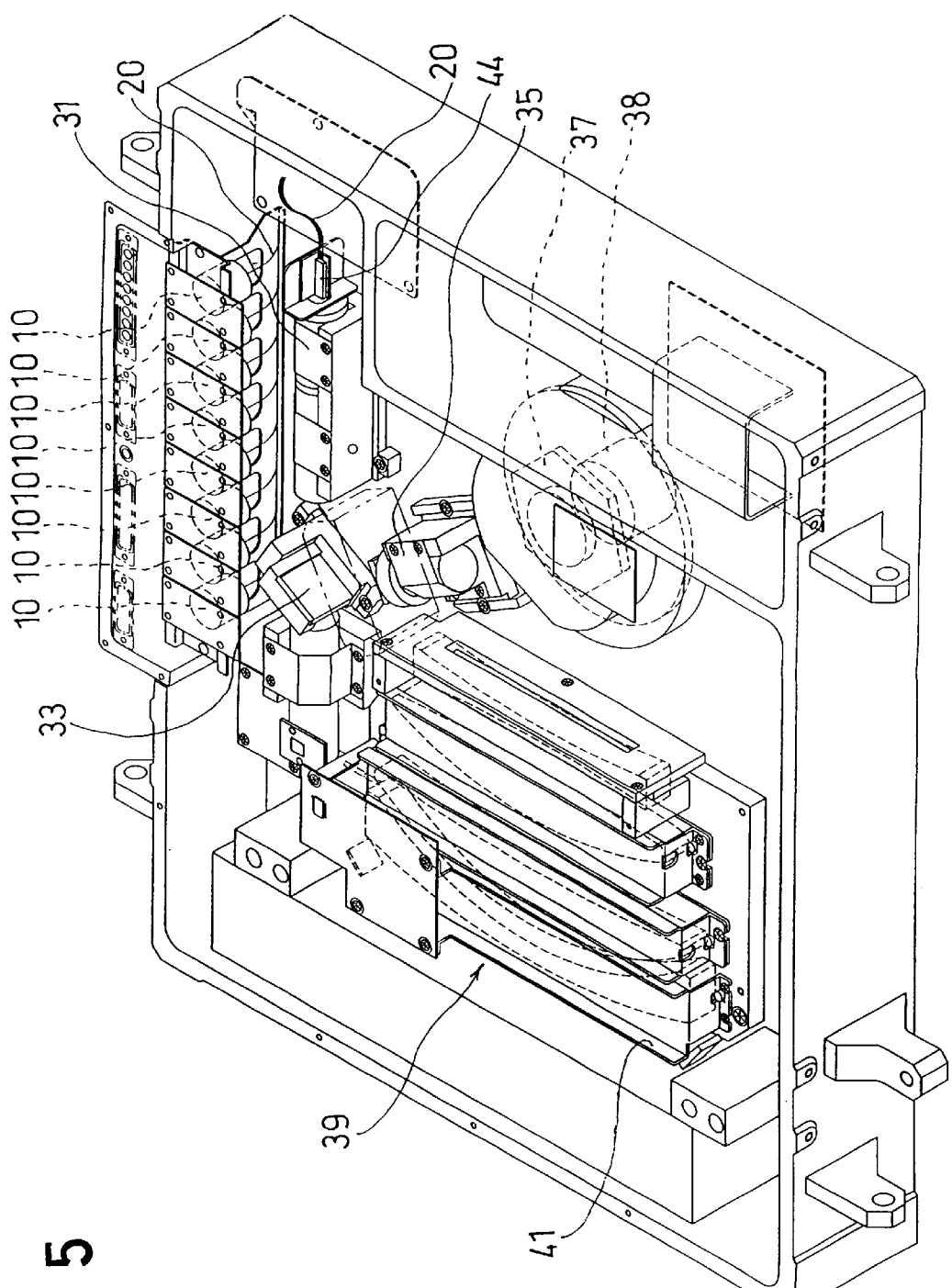
FIG. 5 is a schematic perspective view of a multi-laser drawing apparatus to which A coupling apparatus for a light emitting element and an optical fiber according to the present invention is applied; and, FIG. 6 is an exploded perspective view of a light emission end structure of a multi-laser source using optical fibers.
Figure 6:
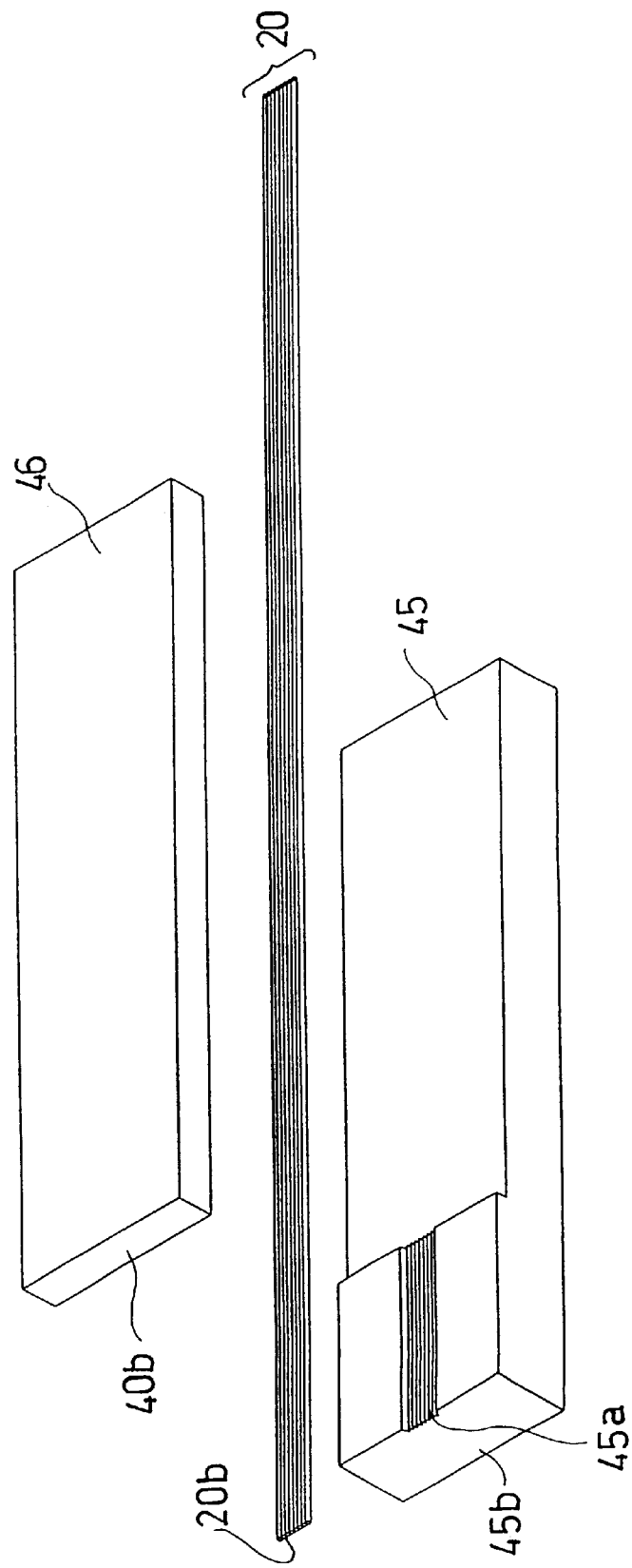

Referring to FIGS. 5 and 6, a multi-laser drawing apparatus to which a coupling apparatus of optical fibers according to the present invention by way of example is applied will be discussed below.

A multi-laser drawing apparatus shown in FIG. 5 is composed of a multi-laser source having a plurality of laser sources 10 to which optical fibers 20 are coupled. The laser sources 10 are secured in the form of an array. The optical fibers 20 are held at their emission ends by a fiber array structure (not shown) within a fiber holder block 44, so that the emission ends of the optical fibers 20 are aligned along a line at an equi-pitch (distance) smaller than the distance (pitch) of the remaining portions of the optical fibers.

The laser beams emitted from the laser sources 10 are transmitted through the optical fibers 20 and are emitted from the fiber holder block 44. The laser beams emitted from the fiber holder block 44 are emitted toward a polygonal mirror 37 which is rotated, through a collimating lens 31, a reflection mirror 33, and a beam shaping optical system 35. The laser beams reflected and deflected by the polygonal mirror 37 are transmitted through an fθ lens group 39; are reflected by a mirror 41; and are made incident upon an outer peripheral surface of a photosensitive drum to scan the same. In the illustrated embodiment, the polygonal mirror 37 is driven at a constant speed by a spindle motor 38, and the laser sources 10 are turned ON or OFF in synchronization with a pixel clock which is in turn synchronized with the rotation of the spindle motor 38 and in accordance with drawing data.

As can be seen in FIG. 6, the emission ends 20b of the optical fibers 20 are spaced at a predetermined distance and are interconnected to form a fiber array so that the laser beams emitted from the emission ends 20b reach respective points on a drawing surface, which are spaced at a predetermined distance from one another in the main scanning direction and sub-scanning direction. Namely, the optical fibers 20 are received in respective parallel V-shaped grooves 45a of a V-groove block 45 and are pressed by a retainer block 46. The optical fibers 20, the V-groove block 45 and the retainer block 46 are adhered together. The emission ends 20b of the optical fibers 20 are polished together with the ends 45b and 46b of the blocks 45 and 46 on the emission side to define a plane normal to the central axes of the fibers 20.

Figure 3:
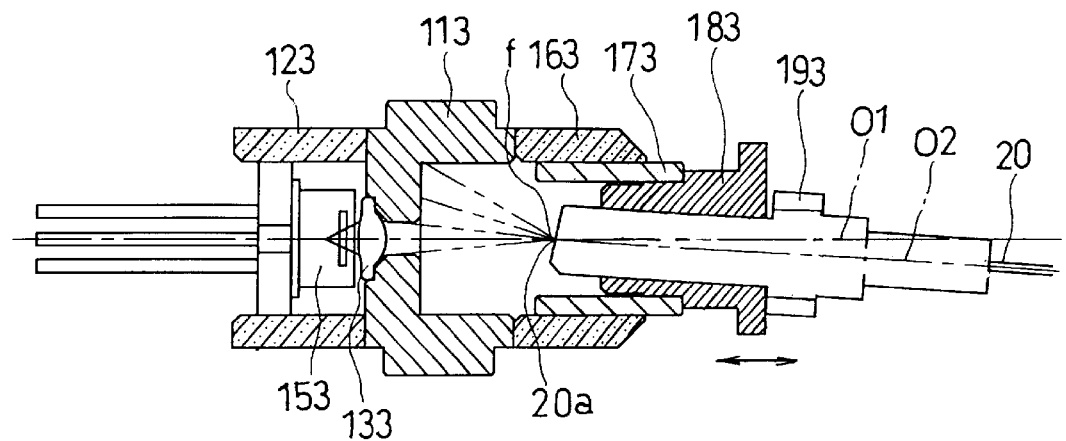
FIG. 3 is an enlarged longitudinal sectional view of a third embodiment of A coupling apparatus for a light emitting element and an optical fiber, according to the present invention.
Figure 1:
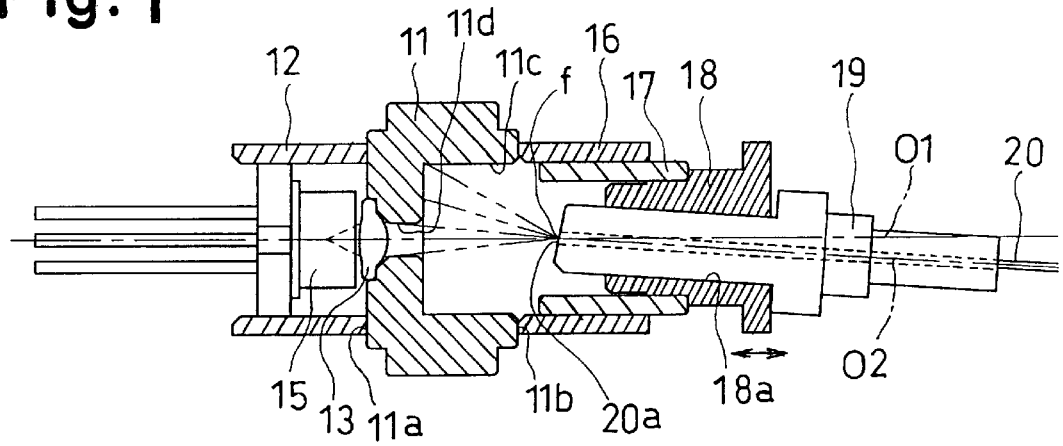
FIG. 1 is an enlarged longitudinal sectional view of a first embodiment of A coupling apparatus for a light emitting element and an optical fiber, according to the present invention.
Figure 2:
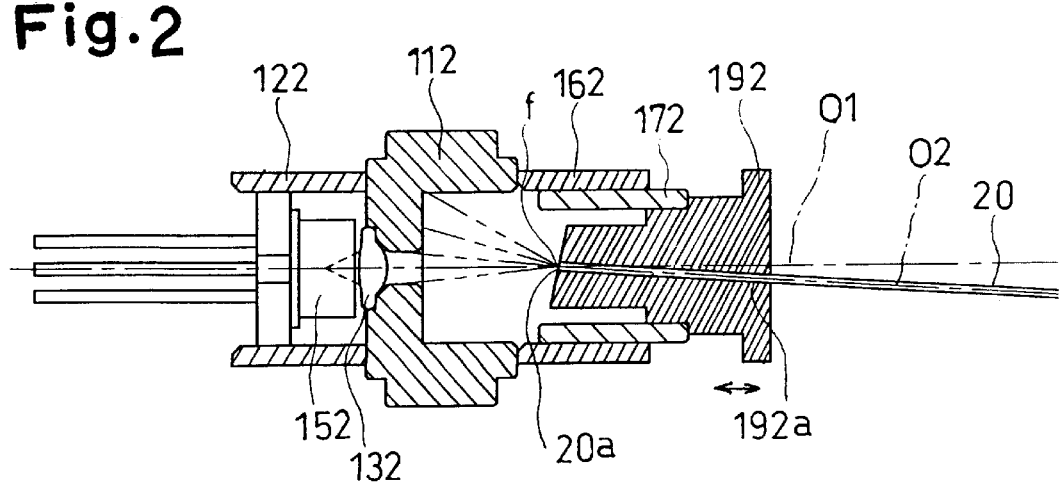
FIG. 2 is an enlarged longitudinal sectional view of a second embodiment of A coupling apparatus for a light emitting element and an optical fiber, according to the present invention.
Figure 4:
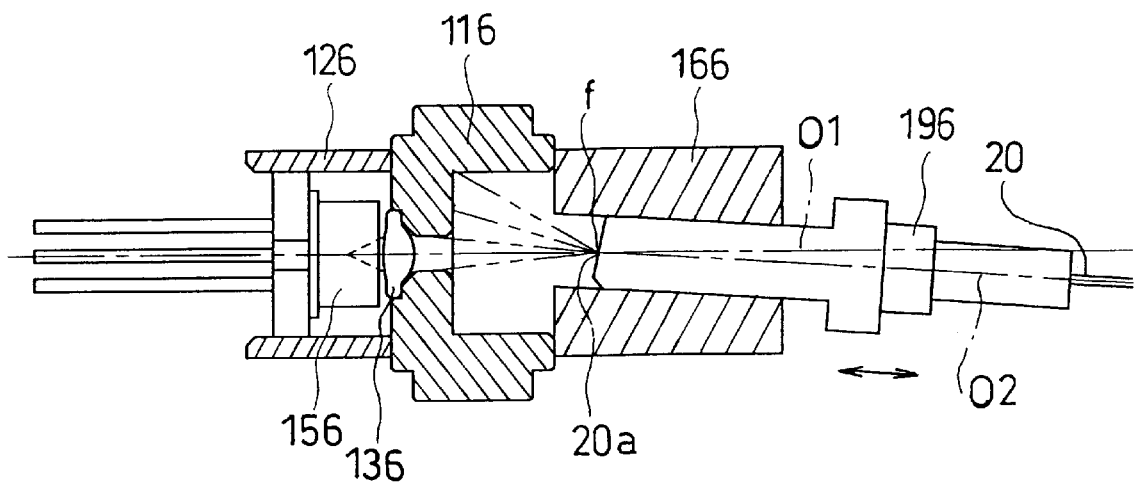
FIG. 4 is an enlarged longitudinal sectional view of a known coupling apparatus of a light emitting element and an optical fiber.

The present invention can be applied to a multi-laser beam drawing apparatus constructed as above. FIGS. 1, 2 and 3 show enlarged longitudinal sectional views of first, second and third embodiments of the present invention. In these embodiments, according to the features of the present invention, the ferrule 19, 192 or 193 is moved in a direction parallel with the optical axis of the coupling lens 13, 132 or 133 to adjust the position of the optical fibers 20 at the incident surfaces 20a thereof.

In the first embodiment shown in FIG. 1, the LD holder 12 which holds the laser diode 15 as a laser source 10 is secured to the lens holder 11 which holds the coupling lens 13. The laser diode 15 is inserted and secured in the cylindrical LD holder 12. The coupling lens 13 is secured to an opening formed in the center of the bottom of the lens holder 11. The LD holder 12 abuts against the outer side surface 11a of the lens holder 11 to adjust the alignment of the axes of the laser diode 15 and the coupling lens 13. After the completion of the adjustment, the contact portion between the LD holder 12 and the lens holder 11 are welded, for example, by means of a YAG laser. The cylindrical adjusting ring 16 is secured to the end surface 11b of the cylindrical portion of the lens holder 11 by laser welding.

The incident end surface of the optical fiber 20 is extended linearly and secured to the ferrule 19. The ferrule 19 and the incident end surface (core surface) 20a of the optical fiber 20 are polished so as to define a planar surface which is inclined at a predetermined inclination angle with respect to the direction perpendicular to the center axis O2 of the optical fiber 20 within the ferrule 19. The ferrule 19 is inserted and secured in an oblique through-hole 18a formed in a ferrule holder 18 and inclined at a predetermined angle with respect to the optical axis O1. Namely, the axis O2 of the oblique through-hole 18a is inclined with respect to the axis O1 of the ferrule holder 18 whose outer surface is defined by a cylindrical surface. The cylindrical ferrule holder 18 is press-fitted in a ferrule ring 17 which is inserted in the adjusting ring 16.

The ferrule holder 18 (outer surface thereof), the ferrule ring 17 and the adjusting ring 16 are concentric to each other and constitute a concentric annular structure.

The ferrule ring 17 is slidably inserted in the adjusting ring 16 to move in the optical axis direction O1. The ferrule ring 17 is secured to the adjusting ring 16, for example, by YAG laser welding, after the distance between the incident surface 20a and the coupling lens 13 is adjusted (i.e., the focusing operation is completed). The ferrule holder 18 is press-fitted in the ferrule ring 17 so as to move in the optical axis direction O1. Namely, the ferrule 19 is held by the lens holder 11 so as to move in the optical axis direction O1 while keeping a predetermined angle between the axis O2 of the ferrule 19 and the optical axis O1.

In the first embodiment, the assembling and disassembling operations are carried out as follows.

The laser diode 15 is secured in a predetermined position in the LD holder 12. Thereafter, the coupling lens 13 is secured to the lens holder 11 by means of an adhesive or the like, so that the optical axis O1 is substantially identical to the axis of the lens holder 11. The LD holder 12 abuts against the lens holder 11 and the laser diode 15 and the coupling lens 13 are aligned (axis adjustment in two orthogonal directions). Thereafter, the LD holder 12 is secured to the lens holder 11, for example, by YAG welding.

The optical fiber 20 is inserted and secured in the ferrule 19 and is polished together with the ferrule 19, so that the incident surface 20a forms a planar surface which is inclined at a predetermined inclination angle with respect to a direction perpendicular to the center axis O2. The ferrule 19 is thereafter inserted or press-fitted and adhered in the oblique through-hole 18a of the ferrule holder 18. The axis of the oblique through-hole 18a is not parallel with but is inclined with respect to the axis of the ferrule holder 18. The ferrule holder 18 is press-fitted into the ferrule ring 17 which is inserted in the adjusting ring 16. The adjusting ring 16 is brought into contact with the lens holder 11 and thereafter, the position of the adjusting ring 16 in a plane perpendicular to the optical axis O1 is adjusted so that the incident surface 20a is located on the optical axis O1. Namely, the adjusting ring 16 is moved in the direction perpendicular to the optical axis O1 while keeping the same in contact with the end surface of the lens holder 11. Upon completion of the adjustment, the adjusting ring 16 is secured to the lens holder 11, for example, by YAG welding.

Thereafter, the ferrule ring 17 is moved along the inner peripheral surface of the adjusting ring 16 so that the incident surface 20a is located at the focal point f of the coupling lens 13. Thus, the focus adjustment is carried out. Note that since the movement of the ferrule ring 17 occurs in the direction parallel with the optical axis O1, the incident surface 20a moves in parallel with the optical axis O1. However, no movement of the ferrule ring 17 in the direction perpendicular to the optical axis takes place, and hence the incident surface 20a is always located on the optical axis O1. After the focus adjustment is completed, the ferrule ring 17 is welded to the adjusting ring 16 to prevent the incident surface 20a, whose position has been adjusted, from being deviated from the focal point of the coupling lens in use.

FIG. 2 shows a second embodiment of the present invention. The main difference between the first embodiment and the second embodiment resides in the point that the ferrule holder 18 and the ferrule 19 are made of separate pieces in the first embodiment and are made of one piece 192 in the second embodiment, respectively. The structures of the lens holder 112, the LD holder 122, the coupling lens 132 and the laser diode 152 are same as those in the first embodiment shown in FIG. 1.

In the second embodiment, the ferrule 192 is provided with a linear fiber hole 192a which is inclined at a predetermined inclination angle with respect to the axis of the ferrule 192. The optical fiber 20 is press-fitted or inserted and secured in the fiber hole 192a. The incident surface 20a of the optical fiber 20 is polished together with the end face of the ferrule 192, so that the incident surface 20a is inclined at a predetermined inclination angle with respect to the center axis of the optical fiber 20 and the center axis of the ferrule 192 passes through the center of the incident surface 20a of the optical fiber 20. The ferrule 192 is press-fitted in the ferrule ring 172 which is in turn inserted in the adjusting ring 162.

To secure the adjusting ring 162 to the lens holder 112, first, the adjusting ring 162 is moved in a plane perpendicular to the optical axis O1 to align the axis of the incident surface 20a with the optical axis O1. Upon completion of the alignment, the adjusting ring 162 and the lens holder 112 are secured to each other by laser welding.

Thereafter, the ferrule ring 172 is moved along the inner peripheral surface of the adjusting ring 162 to move the incident surface 20a to the focal point f of the coupling lens 132. Thus, the focus adjustment is effected. The movement of the ferrule ring 172 occurs in the optical axis direction, and hence the incident surface 20a is moved in the optical axis direction O1. However, since no movement of the ferrule ring 172 in the direction perpendicular to the optical axis O1 takes place, the incident surface 20a is not deviated from the optical axis. After the completion of the focus adjustment, the ferrule ring 172 is secured (welded) to the adjusting ring 162.

FIG. 3 shows a third embodiment of the present invention. The main difference between the first embodiment and the third embodiment resides in the point that the LD holder 123 and the adjusting ring 163 are made of a material such as a ceramic material, which can be adhered to the lens holder 113, so that they can be adhered upon completion of the adjustment, in the third embodiment. The structures of the ferrule ring 173, the ferrule holder 183 and the ferrule 193 and the position adjustment process are same as those of the ferrule ring 17, the ferrule holder 18 and the ferrule 19 in the first embodiment shown in FIG. 1.

In the above-mentioned embodiments, the ferrule is adjustable independently in the directions perpendicular to and parallel with the optical axis O1. Consequently, the alignment of the fiber can be simplified and the time necessary for the alignment operation can be shortened.

In the above-mentioned embodiments, if the laser diode 15, 153 or 152 is broken, the ferrule holder 18 or 183 is detached or removed from the ferrule ring 17 or 173 or the ferrule 192 is detached or removed from the ferrule ring 172 by means of a detaching tool. Thereafter, a new ferrule ring 17, 173 or 172 is press-fitted in the ferrule holder 18 or 183, or the ferrule 192. Consequently, the assembling operation and the adjustment can be carried out, using a new laser diode and new parts (LD holder 12, 123 or 122; adjusting ring 16, 163 or 162; and lens holder 11, 113 or 112) in accordance with the above-mentioned assembling and adjustment processes. Thus, the replacement of the laser diode can be facilitated.

As may be understood from the above discussion, according to the present invention, since the ferrule which holds the optical fiber which is inclined at a predetermined inclination angle with respect to the optical axis of the coupling lens is held to move in a direction parallel with the optical axis of the coupling lens, not only can the alignment of the fiber be easily carried out but also the time necessary therefor can be reduced.

Moreover, according to the present invention, since the ferrule holder is detachably press-fitted in the ferrule ring, the replacement of the laser diode, the coupling lens or the lens holder can be facilitated and the realignment of the fibers after the replacement can be easily carried out.

What is claimed is:

1. A coupling apparatus for a light emitting element and an optical fiber, for coupling a holder, to which said light emitting element and a coupling lens are secured, with said optical fiber; said coupling apparatus comprising:
   a ferrule which holds said optical fiber and is inclined at a predetermined angle with respect to the optical axis of said coupling lens; and,
   a support member which is secured to a lens holder and which holds said ferrule so as to enable the ferrule to be movable in a direction parallel with the optical axis of said coupling lens said support member comprises:
   an adjustable ring which is movable and adjustable in a plane perpendicular to the optical axis of said coupling lens and which can be secured to said lens holder;
   a ferrule ring supported within said adjusting ring wherein said ferrule ring is movable in a direction parallel with the optical axis of said coupling lens; and
   a ferrule holder which is detachably press-fitted in said ferrule ring so as to move the same in a direction parallel with the optical axis of said coupling lens;
   wherein said ferrule is held by said ferrule holder at an inclined position with respect to the optical axis and which is movable together with said ferrule holder in a direction parallel with the optical axis.

2. A coupling apparatus for a light emitting element and an optical fiber according to claim 1, wherein the incident end surface of said optical fiber is inclined at a predetermined angle with respect to a plane which is normal to the optical axis of said coupling lens.

3. A coupling apparatus for a light emitting element and an optical fiber according to claim 1, wherein said support member comprises:
   an adjustable ring which is movable and adjustable in a plane perpendicular to the optical axis of said coupling lens and which can be secured to said lens holder; and
   a ferrule ring supported within said adjusting ring, wherein said ferrule ring is movable in a direction parallel with the optical axis of said coupling lens;
   wherein said ferrule is held in said ferrule ring at an inclined position with respect to the optical axis and which is movable together with said ferrule ring in a direction parallel with the optical axis.

4. A coupling apparatus for a light emitting element and an optical fiber according to claim 1, wherein said ferrule holder and said adjusting ring are made of metal and are secured to said lens holder by laser welding.

5. A coupling apparatus for a light emitting element and an optical fiber according to claim 1, wherein said ferrule holder is made of metal and said adjusting ring is made of a ceramic material, so that said ferrule holder and said adjusting ring are secured to each other by an adhesive.

6. A coupling apparatus for a light emitting element and an optical fiber, comprising:
   a lens holder to which said light emitting element, a coupling lens and said optical fiber are to be secured;
   an adjusting ring which is movable and adjustable in a plane perpendicular to the optical axis of said coupling lens and which is secured to said lens holder upon completion of positional adjustment between said adjusting ring and said lens holder;
   a ferrule ring which is fitted inside said adjusting ring movable in a direction parallel with the optical axis of said coupling lens and which is secured to said adjusting ring upon completion of positional adjustment between said ferrule ring and said adjusting ring; and
   a ferrule member which is fitted in said ferrule ring and movable in a direction parallel to said optical axis and which holds said optical fiber in a position so that said optical fiber is inclined at a inclination angle with respect to the optical axis of said coupling lens.

7. A coupling apparatus for a light emitting element and an optical fiber according to claim 6, wherein the incident end surface of said optical fiber is inclined at a predetermined angle with respect to a plane which is normal to the optical axis of said coupling lens.

8. A coupling apparatus for a light emitting element and an optical fiber according to claim 6, wherein said ferrule member comprises:

a ferrule holder which is press-fitted inside said ferrule ring, said ferrule holder holds said optical fiber.

9. A coupling apparatus for a light emitting element and an optical fiber according to claim 6, wherein said ferrule member comprises a single ferrule holder fitted inside said adjusting ring, said ferrule holder being movable in a direction parallel with the optical axis of said coupling lens.

10. A coupling apparatus for a light emitting element and an optical fiber according to claim 6, wherein said ferrule holder and said adjusting ring are made of metal and are secured to said lens holder by laser welding.

11. A coupling apparatus for a light emitting element and an optical fiber according to claim 6, wherein said lens holder is made of metal and said adjusting ring is made of a ceramic material, so that said lens holder and said adjusting ring are secured to each other by an adhesive.

12. A method for adjusting the position of an optical fiber in a coupling apparatus wherein said coupling apparatus comprises:

a lens holder, one end of which a light emitting element and a coupling lens are secured to and the other end of which said optical fiber is connected;

an adjusting ring to be secured to said lens holder;

a ferrule ring which is fitted inside said adjusting ring, said ferrule being movable in a direction parallel with the optical axis of said coupling lens; and a ferrule member which is fitted inside said ferrule ring and which holds said optical fiber in a position so that said optical fiber is inclined at a predetermined angle with respect to the optical axis of said coupling lens, said method comprises:

moving said adjustable ring in a plane perpendicular to the optical axis of said coupling lens and securing said adjusting ring to said lens holder upon completion of position adjustment between said adjusting ring and said lens holder;

moving said ferrule ring in said adjusting ring in a direction parallel with the optical axis of said coupling lens and securing said ferrule ring to said adjusting ring upon completion of position adjustment between said ferrule ring and said adjusting ring and moving said ferrule member in said ferrule ring in a direction parallel with the optical axis and securing said ferrule member in said ferrule ring upon completion of positional adjustment between said ferrule member and said ferrule ring.

\* \* \* \* \*